(12) United States Patent
Simonsohn et al.

(10) Patent No.: US 7,744,977 B2
(45) Date of Patent: Jun. 29, 2010

(54) SUPPORT COIL COMPRISING A MECHANICAL LOCKING MEANS AND METHOD FOR THE PRODUCTION THEREOF

(75) Inventors: Thilo Simonsohn, Munich (DE); Christian Heindl, Munich (DE)

(73) Assignee: Tyco Electronics Raychem GmbH, Ottobrunn (DE)

( * ) Notice: Subject to any disclaimer, the term of this patent is extended or adjusted under 35 U.S.C. 154(b) by 154 days.

(21) Appl. No.: 11/743,704

(22) Filed: May 3, 2007

(65) Prior Publication Data

US 2007/0275195 A1    Nov. 29, 2007

(30) Foreign Application Priority Data

May 24, 2006  (DE)  ......................... 10 2006 024 840

(51) Int. Cl.
*B32B 3/06* (2006.01)
(52) U.S. Cl. .............................. 428/57; 428/37; 428/53; 428/156
(58) Field of Classification Search .................... 428/57, 428/53, 156, 27
See application file for complete search history.

(56) References Cited

U.S. PATENT DOCUMENTS 5,087,492 A * 2/1992 Vallauri et al. .............. 428/34.9

| 5,670,223 | A | 9/1997 | Sadlo et al. |
| 2005/0208270 | A1* | 9/2005 | Liang ........................ 428/156 |
| 2007/0218232 | A1 | 9/2007 | Simonsohn |
| 2009/0269529 | A1 | 10/2009 | Simonsohn |

FOREIGN PATENT DOCUMENTS

| DE | 198 20 634 C1 | 2/2000 |
| EP | 0 399 263 A2 | 11/1990 |
| EP | 0 619 636 A1 | 10/1994 |
| WO | WO 83/00779 | 3/1983 |
| WO | 93/22816 A1 | 11/1993 |
| WO | WO 93/22816 | 11/1993 |
| WO | WO 96/24977 | 8/1996 |
| WO | WO 98/21802 A1 | 5/1998 |

* cited by examiner

*Primary Examiner*—Brent T O'Hern
(74) *Attorney, Agent, or Firm*—Barley Snyder LLC

(57) ABSTRACT

A support coil for radially supporting an elastically expanded tube material includes an extruded profile body consisting of a plurality of windings wound about a longitudinal axis of the support coil. Each of the windings has opposing end faces. A ratchet arrangement joins the end faces of the adjacent windings with respect to the longitudinal axis of the support coil. A tongue and groove arrangement joins the end faces of the adjacent windings with respect to a radial direction of the support coil. The tongue and groove arrangement is spatially separated from the ratchet arrangement.

18 Claims, 4 Drawing Sheets

US 7,744,977 B2

SUPPORT COIL COMPRISING A MECHANICAL LOCKING MEANS AND METHOD FOR THE PRODUCTION THEREOF

CROSS-REFERENCE TO RELATED APPLICATIONS

This application claims the benefit of the filing date under 35 U.S.C. §119(a)-(d) of German Patent Application No. DE 10 2006 024 840.6, filed May 24, 2006.

FIELD OF THE INVENTION

The invention relates to a support coil for radially supporting an elastically expanded tube material comprising an extruded profile body consisting of a plurality of windings wound about a longitudinal axis of the support coil wherein a ratchet arrangement joins end faces of the adjacent windings with respect to the longitudinal axis of the support coil and a tongue and groove arrangement joins the end faces of the adjacent windings with respect to a radial direction of the support coil.

BACKGROUND

Support coils are used to radially support a resiliently expanded tube material, such as an insulating tube or sleeve body, during the insertion of an electrical component therein. For example, the insulating tube and/or sleeve body may be used to electrically insulate and/or seal electrical components, such as cable couplings or cable plug connectors, in power engineering applications. Because high electrical voltages above 100 kV can be applied to the electrical components, the insulating tube is formed to have a thick wall and is made of a material with good electrical insulation properties, such as silicone. The tube material may be, for example, a cold shrink tube, and is formed to resiliently adapt to an outer contour of the electrical component such that the electrical component is insulated and sealed as tightly as possible. The tube material may have a diameter that is capable of expanding up to four times its original size prior to fitting of the electrical component therein. The electrical component can therefore be easily introduced into the tube material.

In order to keep the tube material expanded prior to fitting of the electrical component, a support coil is inserted into the tube material. The support coil resiliently expands the tube material and absorbs the restoring force of the tube material due to the resilient expansion thereof. The support coil absorbs, for example, compressive forces of about 10 bar. The electrical component is then inserted into the support coil. The support coil is then removed from the tube material to allow the tube material to tighten around the electrical component. Because the support coil is an extruded profile body consisting of a plurality of windings, the support coil may be removed from the tube material by manually unwinding or unraveling the support coil in a longitudinal axis. As the support coil gradually unravels, the tube material automatically tightens around the electrical component to be insulated. The unwound extruded profile body may then be extracted from the tube material.

In view of the foregoing, the support coil must be formed such that the support coil can permanently withstand the high pressure emanating from the expanded tube material and can be removed manually from the tube material. It is also important for the support coil to have a wall thickness that is as low as possible to allow sufficient overall space for the introduction of the electrical component therein. In order to meet these requirements, it is known to join together end faces of the windings of the extruded profile body of the support coil in a material-uniting manner, for example, by welding or bonding. It is additionally known to form the end faces of the windings of the extruded profile body of the support coil such that adjacent end faces of the windings interlock. Examples of these types of support coils are described in U.S. Pat. No. 5,087,492, EP 0 619 636 A1, WO 93/22816, WO 83/00779, DE 198 20 634 C1, EP 0 399 263 A2, U.S. Pat. No. 5,670,223 and WO 96/24977.

A problem exists in the above-described support coils in that the material-uniting connection between the end faces of the windings is not uniformly tight. A non-uniform connection between the end faces of the windings can cause the detaching forces required for manually unwinding the extruded profile body to markedly fluctuate, such that manually separating the connected end faces can, on unraveling of the windings, become difficult or even impossible. Additionally, a non-uniform connection between the end faces of the windings can cause the support coil to break or fail under the load of the resiliently expanded tube material.

BRIEF SUMMARY

It is therefore an object of the present invention to provide a support coil which is of a particularly simple construction and joins the end faces of the extruded profile body sufficiently tightly to eliminate the need for additional material-uniting connection of the end faces. It is further an object of the present invention to provide a support coil that can be produced particularly cost-effectively, because costly and time-consuming welding or bonding of the end faces is dispensed with.

This and other objects are achieved by a support coil for radially supporting an elastically expanded tube material comprising an extruded profile body consisting of a plurality of windings wound about a longitudinal axis of the support coil. Each of the windings has opposing end faces. A ratchet arrangement joins the end faces of the adjacent windings with respect to the longitudinal axis of the support coil. A tongue and groove arrangement joins the end faces of the adjacent windings with respect to a radial direction of the support coil. The tongue and groove arrangement is spatially separated from the ratchet arrangement.

DETAILED DESCRIPTION OF THE EMBODIMENT(S)

Figure 1:
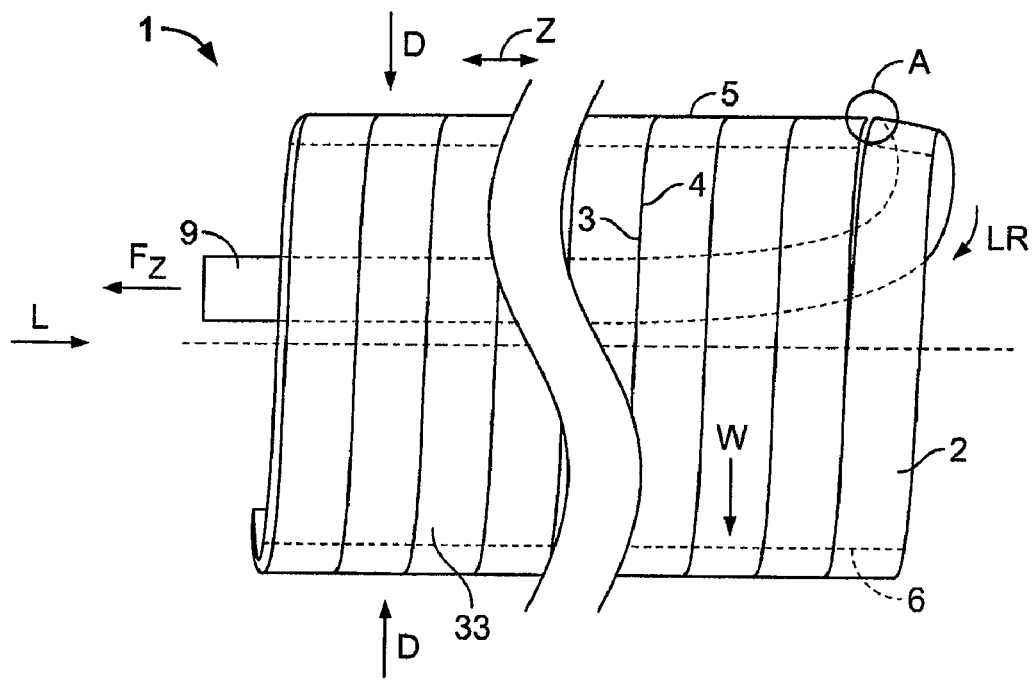
FIG. 1 is a schematic view of a support coil according to a first embodiment of the present invention.

FIGS. 1-5 show a support coil 1 according to a first embodiment of the present invention. As shown in FIG. 1, the support coil 1 consists of an extruded profile body 2 wound in a winding direction W to form a plurality of windings 33. A free end 9 of the windings 33 extends from the support coil 1. The extruded profile body 2 is a substantially continuous member produced, for example, by extrusion. The extruded profile body 2 may be formed from a flexible and solid material, such as a plastic material, so that the support coil 1 is able to withstand radially inwardly acting compressive forces D. The support coil 1 has a length of about 30-50 centimeters; however, the support coil 1 may theoretically be produced to have an infinite length.

The support coil 1 extends in a longitudinal axis L. The support coil 1 is substantially tubular and has a radial external surface 5 and a radial internal surface 6. The external surface 5 and the internal surface 6 are formed substantially parallel to each other in cross-section and form a substantially cylindrical external circumferential surface and a substantially cylindrical internal circumferential surface, respectively, of the support coil 1. Although the support coil 1 is shown and described as having a substantially circular cross-section, it will be appreciated by those skilled in the art that the support coil 1 may have other cross-sectional configurations, for example, the cross-section may be oval or square.

Figure 3:
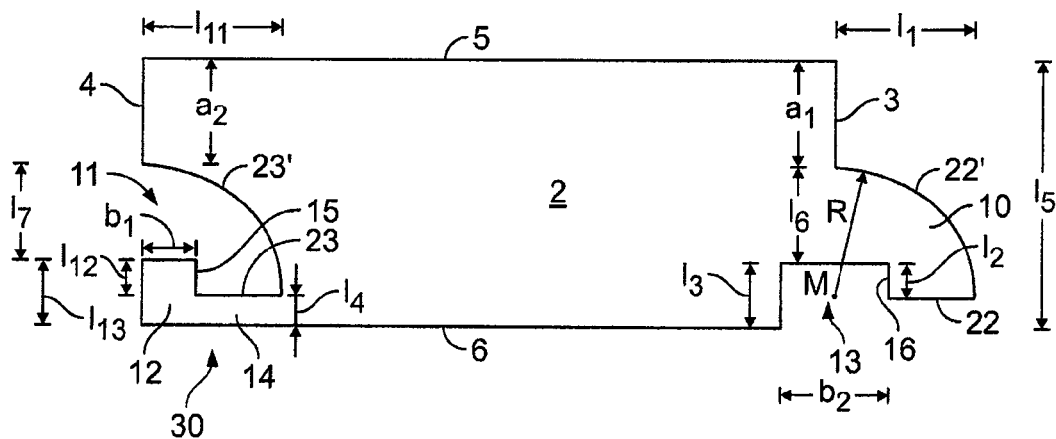
FIG. 3 is a schematic cross-section of an extruded profile body of the support coil in FIG. 1.

Each of the windings 33 of the extruded profile body 2 has end faces 3, 4 that extend substantially parallel to each other. As shown in FIG. 3, the end face 3 has a tongue 10 and a ratchet mount 13. The tongue 10 forms the ratchet mount 13 in certain portions. The tongue 10 projects in the longitudinal axis L in cross-section and is at a distance a1 from the external surface 5. Between the external surface 5 and the tongue 10, the end face 3 extends substantially perpendicularly to the external surface 5 and the internal surface 6. The tongue 10 has a radial thickness I6. The tongue 10 has a radially outwardly outer holding face 22′ having a substantially circular contour with a radius R about a center point M. The substantially circular contour of the outer holding face 22′ extends about a quarter of a full circle over about 90 degrees so a protruding length I1 of the tongue 10 is identical or substantially similar to the radius R. The tongue 10 has a radially inwardly inner holding face 22 that extends substantially in the longitudinal axis L parallel to the external and internal surfaces 5, 6. The inner holding face 22 has a step that forms a counter-holding face 16 that is part of a substantially rectangular channel formed by the ratchet mount 13. The ratchet mount 13 has a depth I2 relative to the radially inwardly side of the tongue 10 and a depth I3 relative to the internal surface 6. The depth I3 is greater than the depth I2. The ratchet mount 13 has a width b2.

As shown in FIG. 3, the end face 4 opposes the end face 3 and has a groove 11 and a ratchet element 12. The groove 11 is formed so as to be substantially complementary to the tongue 10. The groove 11 has a radially outwardly outer counter-holding face 23′ having a substantially identical circular contour to the outer holding face 22′. The groove 11 has a depth I11 in the longitudinal axis L that is substantially identical to the length I1 of the tongue 10. The groove 11 is set apart from the external face 5 by a distance a2, which is substantially identical to the distance a1. The groove 11 is delimited radially inwardly by an inner counter-holding face 23 formed on a projection 14 that protrudes in the longitudinal axis L. The projection 14 is connected to the ratchet element 12. The projection 14 has a radial thickness I4. The radial thickness I4 of the projection 14 is less than a radial thickness I5 of the extruded profile body 2 and less than the radial thickness I6 of the tongue 10. The projection 14 is therefore the region on the extruded profile body 2 with the lowest radial thickness and thus forms a weakened region 30. An opening to the groove 11 has a radial thickness I7, which is substantially identical to the radial thickness I6 of the tongue 10. The tongue 10 projects from one end face 3, while the opening to the groove 11 is located in the opposite end face 4. The opening is spaced apart from the external and internal surfaces 5, 6. The ratchet element 12 at the end of the projection 14 has a substantially rectangular configuration and has a radial thickness I13 which is substantially identical to the depth I3 of the ratchet mount 13. Relative to the projection 14, the ratchet element 12 protrudes radially outward by a length I12 to form a holding face 15. The length I12 is substantially identical to the depth I2 of the ratchet mount 13. The ratchet element 12 has a width b1 in the longitudinal axis L that is less than the width b2 of the ratchet mount 13. Both the ratchet element 12 and the projection 14 extend radially internally flush in the longitudinal axis L.

Figure 2:
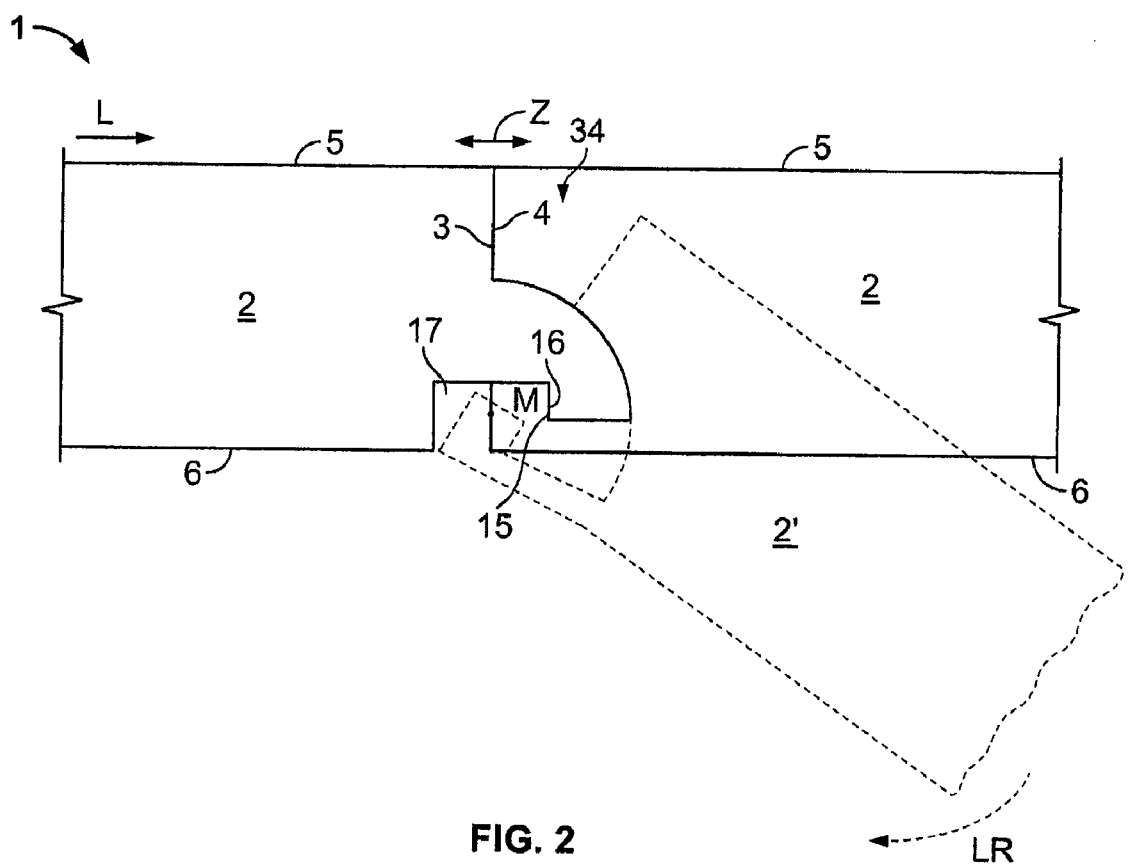
FIG. 2 is a schematic sectional view of detail A in FIG. 1.

As shown in FIG. 2, the tongue 10 and the groove 11 form a tongue and groove arrangement, and the ratchet element 12 and the ratchet mount 13 form a ratchet arrangement wherein both the tongue and groove arrangement and the ratchet arrangement engage to join the end faces 2, 3 of adjacent windings 33 together with respect to the longitudinal axis L of the support coil 1. The end faces 3, 4 of the extruded profile body 2 are therefore locked together in a radial direction. More specifically, as the ratchet element 12 on the end face 4 engages with the ratchet mount 13 on the end face 3, the holding face 15 of the ratchet element 12 rests against the counter-holding face 16 of the ratchet mount 13 so that the end faces 3, 4 of the extruded profile body 2 are locked in the longitudinal axis L thereby preventing separation of the end faces 3, 4 by a tensile force Z. The holding face 15 and the counter-holding face 16 are both oriented substantially perpendicularly to the longitudinal axis L. As the width b1 and the cross-sectional surface area of the ratchet element 12 are smaller than the width b2 and the cross-sectional surface area of the ratchet mount 13, the ratchet mount 13 has a deflection region 17 in the form of an opening which is not filled by the ratchet element 12. The tongue and groove arrangement, the end faces 3, 4 and/or the ratchet arrangement may additionally be at least partially bonded or welded together.

FIG. 2 shows in phantom the extruded profile body 2′ during the separation of adjacent windings 33 of the support coil 1. When the free end 9 of the windings 33 shown in FIG. 1 is manually pulled, a detachment force Fz acts on the windings 33. The windings 33 of the support coil 1 are rotated radially inwardly in a detachment direction LR. This rotation is carried out substantially about an instantaneous center of rotation (the pivot point M). During this movement, the end faces 3, 4 on the radially outer side move apart from each other and form a radially inwardly tapering gap 34, as shown in FIG. 2. On the radially inner side, the rotational movement in the detachment direction LR away from the counter-holding face 16 causes the ratchet element 12 to be pressed into the deflection region 17. The ratchet element 12 is pressed radially outwardly against the ratchet mount 13, so the projection 14, which, as a result of the lowest thickness I4, has the greatest deflectability on the extruded profile body 2', is elastically deformed. As the radially outer contour of the tongue and groove arrangement extends about the pivot point M, the tongue 10 moves smoothly out of the groove 11, as the outer counter-holding face 23' slides on the outer holding face 22'. Thus, the detaching force Fz can easily be manually applied, because merely a force for resiliently bending the projection 14 in the weakened region 30 and frictional forces in the tongue and groove arrangement have to be applied in order to detach the extruded profile body 2'.

Figure 4:
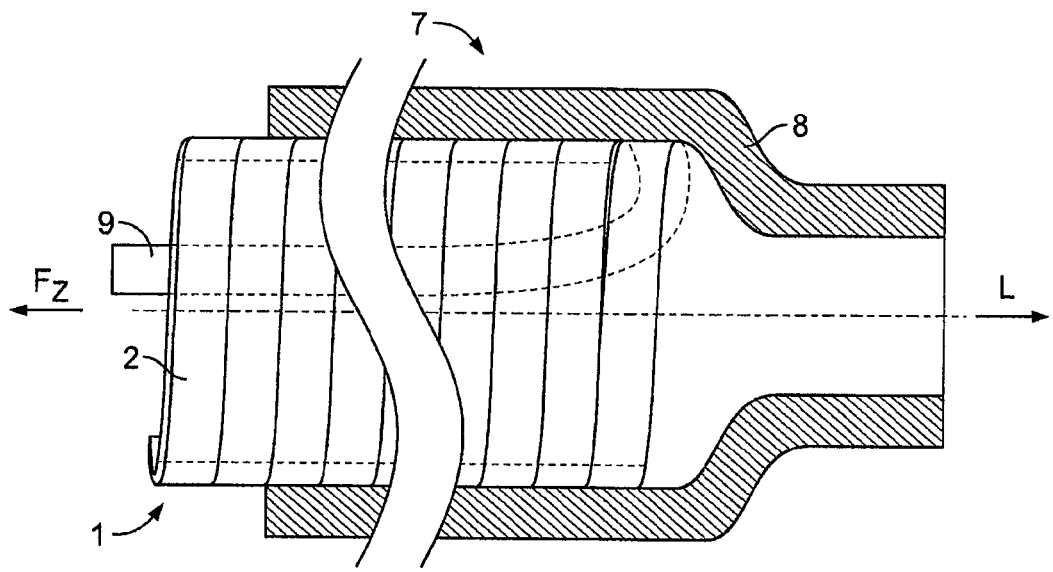
FIG. 4 is a schematic view of a tube arrangement comprising the support coil in FIG. 1.

FIG. 4 shows the coil support 1 used in a tube arrangement 7. In the tube arrangement 7, a resiliently expanded tube material 8, such as an insulating tube or sleeve body used for electrically insulating electrical components, is radially expanded by the support coil 1. The tube material 8 may be, for example, a resilient electrically insulating material, such as silicone. In order to be able to easily position the tube material 8 around the electrical component (not shown), the tube material 8 is expanded by the support coil 1. The electrical component (not shown) is then inserted into the support coil 1. The support coil 1 is then unwound by pulling on the free end 9 of the extruded profile body 2 with the tensile force Fz. The windings 33 of the extruded body 2 are withdrawn from the tube arrangement 7 in the longitudinal axis L. As the windings 33 of the extruded body 2 are removed from the tube material 8, the expanded tube material 8 contracts around the electrical component (not shown), as shown schematically on the right-hand side of FIG. 4.

FIGS. 5-13 show second through tenth embodiments of an extruded profile body 2 of a support coil 1 according to the present invention. Since the second through tenth embodiments of the extruded profile body 2 of the support coil 1 are substantially identical to the extruded profile body 2 of the support coil 1 according to the first embodiment of the present invention, identical elements will be described using the same reference numerals hereafter and only the differences there between will be described in greater detail.

Figure 5:
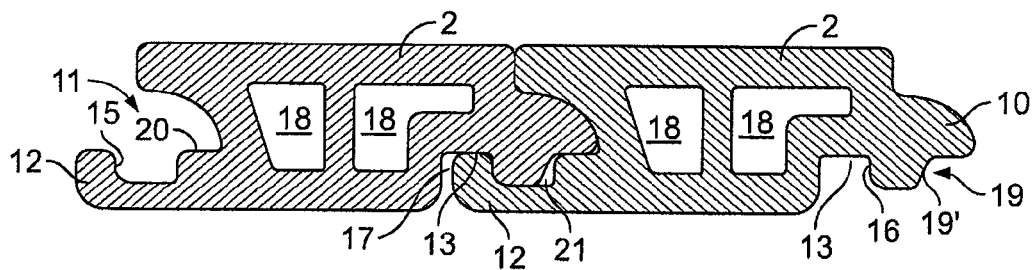
FIG. 5 is a schematic sectional view of an extruded profile body of a support coil according to a second embodiment of the present invention.

FIG. 5 shows an extruded profile body 2 of a support coil 1 according to a second embodiment of the present invention. As shown in FIG. 5, the extruded profile body 2 has cavities 18 formed therein. The extruded profile body 2 therefore has a closed hollow profile. The cavities 18 lessen the amount of material needed to form the extruded profile body 2 while the closed profile provides stability to the extruded profile body 2. The extruded profile body 2 additionally has substantially rounded corners, which facilitate extrusion of the extruded profile body 2. A step 19 is formed between the tongue 10 and the ratchet mount 13. The groove 11 has a corresponding counter-step 20. The step 19 is larger in cross-section than the counter-step 20 and has a bevel 19' that forms a further deflection region 21 between the step 19 and the counter-step 20 that remains free in the locked state. The bevel 19' also facilitates the engagement of the end faces 3, 4. On detachment of the extruded profile body 2 in the detachment direction LR, the counter-step 20 is moved, as previously described, into the further deflection region 21, without the counter-step 20 interlocking with the step 19. Because the counter-step 20 does not contact the step 19 on detachment of the extruded profile body 2, the requisite detaching force Fz remains relatively low.

Figure 6:
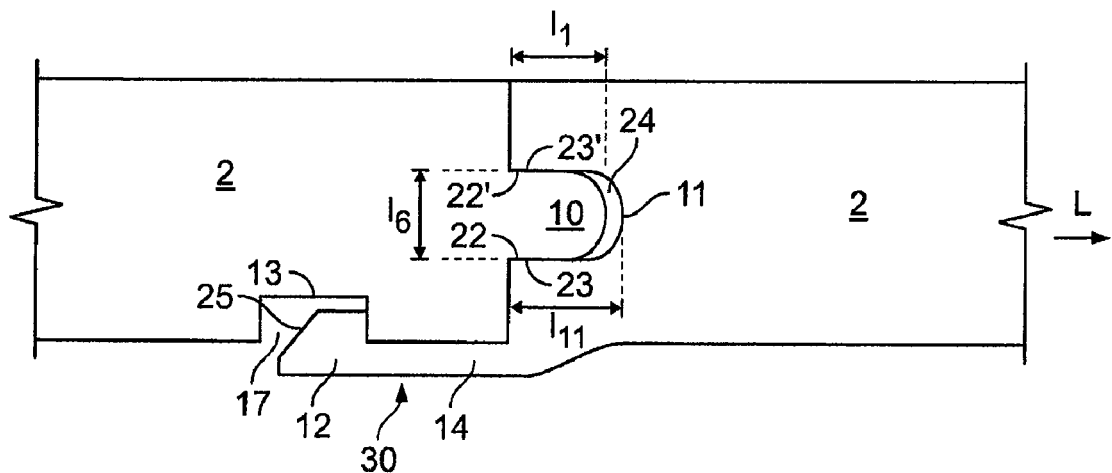
FIG. 6 is a schematic sectional view of an extruded profile body of a support coil according to a third embodiment of the present invention.

FIG. 6 shows an extruded profile body 2 of a support coil 1 according to a third embodiment of the present invention. As shown in FIG. 6, the tongue 10 is formed to have a substantially rectangular rather than arcuate cross-section on one side thereof. The tongue 10 has radially inner and outer holding faces 22, 22', which rest against radially inner and outer counter-holding faces 23, 23' of the groove 11 so as to provide support. The groove 11 is substantially rectangular and has a height I6 in a radial direction substantially identical to the tongue 10. The depth I11 of the groove 11 is greater than the length I1 of the tongue 10, so that a gap 24 is produced in the longitudinal axis L in the locked state. The ratchet element 12 has a chamfer 25 that opposes the holding face 15 and at least partially forms the deflection region 17. The chamfer 25 allows the ratchet 12 to be laterally telescoped so that the ratchet 12 is automatically deflected into the deflection region 17.

Figure 7:
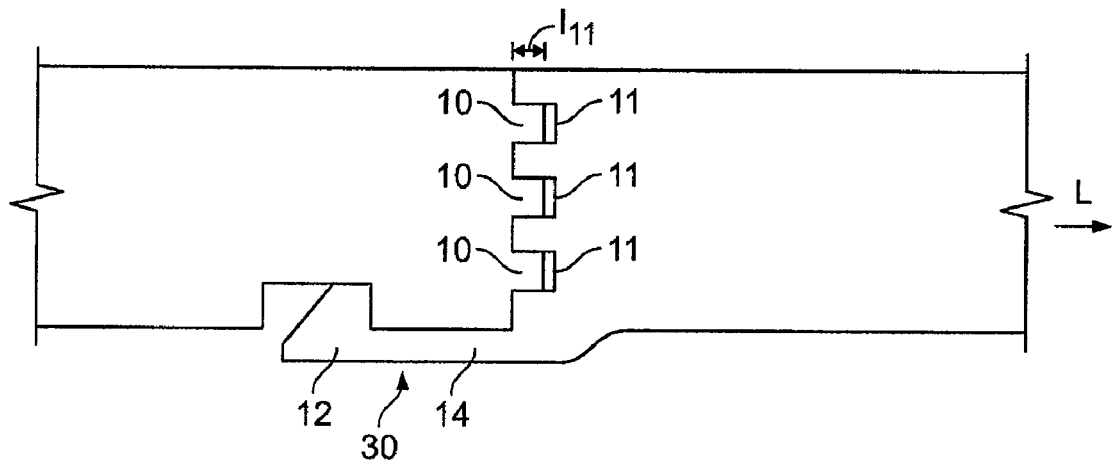
FIG. 7 is a schematic sectional view of an extruded profile body of a support coil according to a fourth embodiment of the present invention.

FIG. 7 shows an extruded profile body 2 of a support coil 1 according to a fourth embodiment of the present invention. As shown in FIG. 7, the tongue and groove arrangement includes a plurality of tongues 10 and a plurality of grooves 11 having substantially the same configurations. The length I11 of the tongue 10 shown in FIG. 7 is less than the length I11 of the tongue 10 shown in FIG. 6. Because the extruded profile body 2 shown in FIG. 7 has a plurality of the tongues 10, the radial loading capacity of the support coil 1 shown in FIG. 7 is substantially identical to the radial loading capacity of the support coil 1 shown in FIG. 6.

Figure 8:
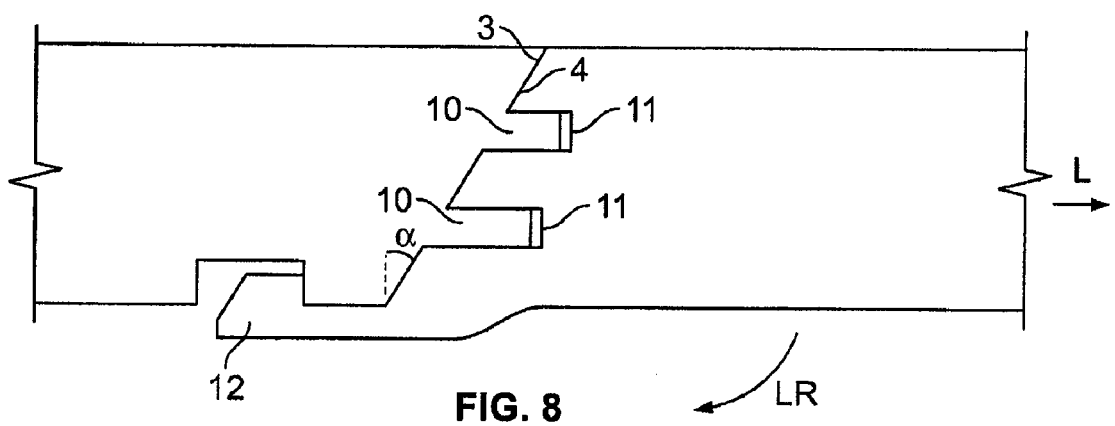
FIG. 8 is a schematic sectional view of an extruded profile body of a support coil according to a fifth embodiment of the present invention.

FIG. 8 shows an extruded profile body 2 of a support coil 1 according to a fifth embodiment of the present invention. As shown in FIG. 8, end faces 3, 4 of the extruded profile body 2 have a pair of tongues 10 and a pair of grooves 11 formed therein that extend obliquely to the longitudinal axis L. The end faces 3, 4 are inclined in the detachment direction LR by an angle a relative to the end faces 3, 4. Rotation of the extruded profile body 2 is therefore assisted on separation of the end faces 3, 4, and the detaching force FZ is reduced.

Figure 9:
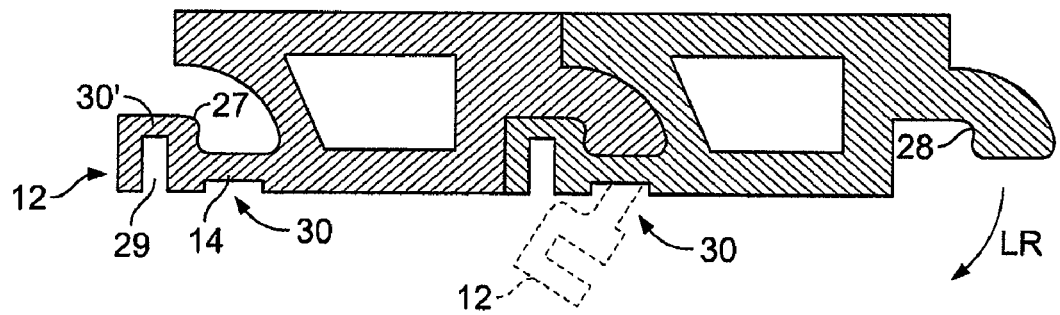
FIG. 9 is a schematic sectional view of an extruded profile body of a support coil according to a sixth embodiment of the present invention.

FIG. 9 shows an extruded profile body 2 of a support coil 1 according to a sixth embodiment of the present invention. As shown in FIG. 9, the extruded profile body 2 has a ratchet element 12 with a locking lug 27 formed on a side facing the groove 11. In the locked state, the locking lug 27 is engaged with a counter-locking means 28 in the ratchet mount 13. The weakened region 30 allows the locking lug 27 to be resiliently deflected. A secure fit of the ratchet element 12 in the ratchet mount 13 is thus ensured. The ratchet element 12 may also be formed to have a slot 29. The slot 29 forms an additional weakened region 30' by which the ratchet element 12 is elastically deformable. The additional weakened region 30' allows the extruded profile body 2 to be rotated more easily on detachment in the detachment direction LR, so the required detaching force FZ is reduced.

Alternatively, the ratchet element 12 may be bent, as shown by the broken line in FIG. 9. On winding of the support coil 1, the tongue and groove arrangement is engaged and then the ratchet element 12 is pressed into the ratchet mount 13 and engaged, for example, by a machine. The weakened region 30 is either elastically deformed and secured by bonding or the like or plastically deformed. As a result, the connection of the end faces 3, 4 of the extruded profile body 2 can be divided into two method steps and thereby simplified.

Figure 10:
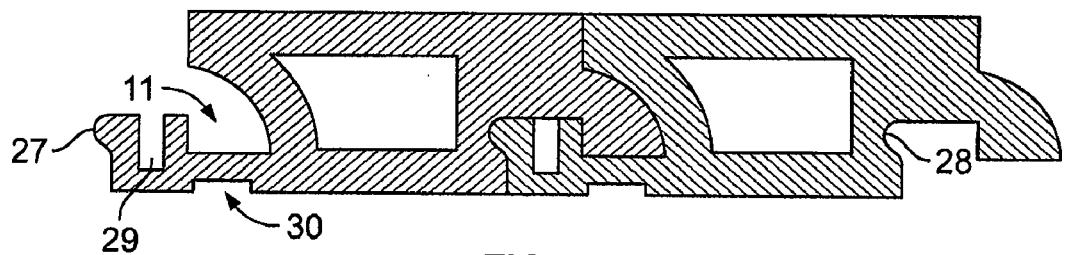
FIG. 10 is a schematic sectional view of an extruded profile body of a support coil according to a seventh embodiment of the present invention.

FIG. 10 shows an extruded profile body 2 of a support coil 1 according to a seventh embodiment of the present invention. As shown in FIG. 10, the locking lug 27 is formed in a side remote from the groove 11, and the slot 29 is radially outwardly opened. The locking lug 27 can therefore be deflected more easily, and the ratchet arrangement 10, 11 can be more easily engaged.

Figure 11:
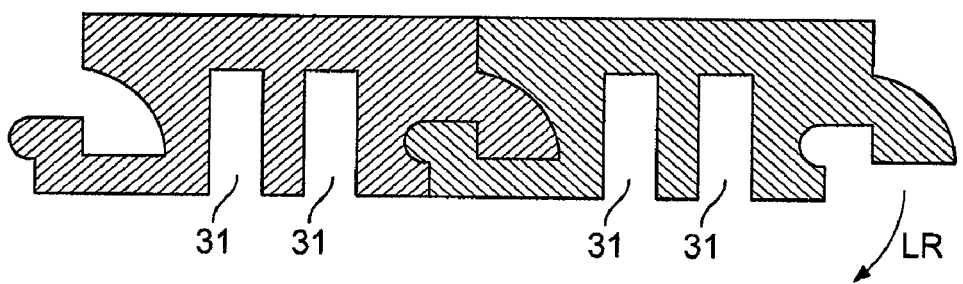
FIG. 11 is a schematic sectional view of an extruded profile body of a support coil according to an eighth embodiment of the present invention.

FIG. 11 shows an extruded profile body 2 of a support coil 1 according to an eighth embodiment of the present invention. As shown in FIG. 11, the extruded profile body 2 has a plurality of slots 31 that allow for reduction of the material used to form the extruded profile body 2. The slots 31 give the extruded profile body 2 an open profile that causes the extruded profile body 2 to be less rigid. The extruded profile body 2 can therefore be resiliently bent in the detachment direction LR and can thus be detached more easily from the support coil 1.

Figure 12:
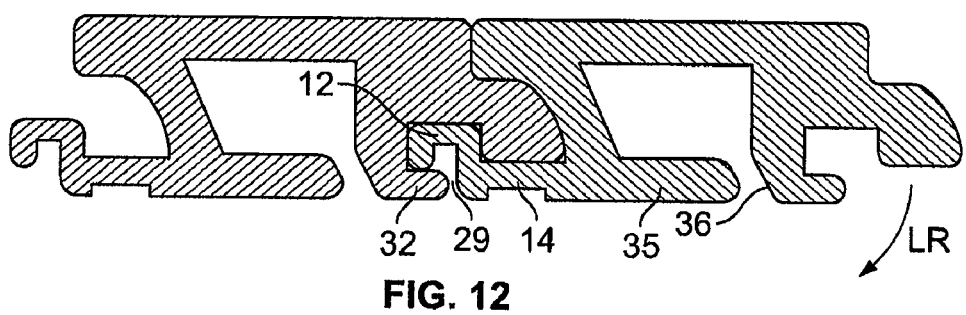
FIG. 12 is a schematic sectional view of an extruded profile body of a support coil according to a ninth embodiment of the present invention.

FIG. 12 shows an extruded profile body 2 of a support coil 1 according to a ninth embodiment of the present invention. As shown in FIG. 12, the extruded profile body 2 is also in the form of an open profile. However, the deformability of the open profile in the detachment direction LR is limited by a stop 35 that engages a stop face 36 during deformation thereof. The ratchet element 12 is in the form of an angular hook extending counter to the detachment direction LR. The ratchet mount 13 has a holding projection 32, which protrudes in the longitudinal axial LR and prevents the ratchet element 12 from moving radially inwardly. On detachment of the extruded profile body 2 in the detachment direction LR, the ratchet element 12 rotates about the holding projection 32 out of the ratchet mount 13.

Figure 13:
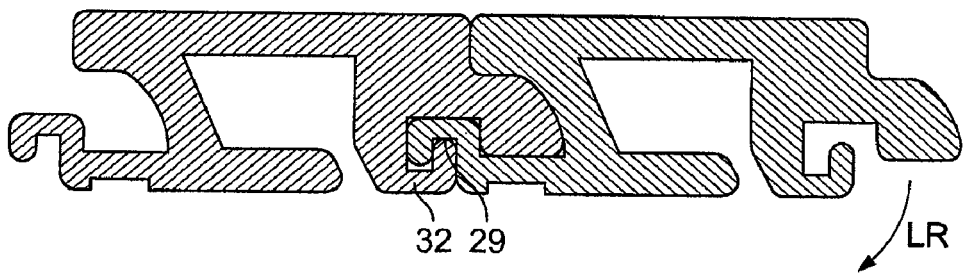
FIG. 13 is a schematic sectional view of an extruded profile body of a support coil according to a tenth embodiment of the present invention.

FIG. 13 shows an extruded profile body 2 of a support coil 1 according to a tenth embodiment of the present invention. As shown in FIG. 13, the holding projection 32 is additionally configured as a hook, which engages with the slot 29 in the ratchet element 12.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A support coil for radially supporting an elastically expanded tube material, comprising:
an extruded profile body consisting of a plurality of windings wound about a longitudinal axis of the support coil, each of the windings having opposing end faces;
a ratchet arrangement having a ratchet element joining the end faces of the adjacent windings with respect to the longitudinal axis of the support coil;
a tongue and groove arrangement joining the end faces of the adjacent windings with respect to a radial direction of the support coil, the tongue and groove arrangement being spatially separated from the ratchet arrangement;
wherein the tongue and groove arrangement is formed between a radial external surface and a radial internal surface of the support coil with the tongue projecting from one end face and the groove providing an opening located in an opposite end face, spaced apart from the external and internal surfaces.

2. The support coil of claim 1, wherein the tongue and groove arrangement is telescopic with respect to the longitudinal axis of the support coil and the tongue and groove arrangement is arranged outside of the ratchet arrangement with respect to the radial direction of the support coil.

3. The support coil of claim 1, wherein the ratchet arrangement is arranged on a radial internal surface of the support coil.

4. The support coil of claim 1, wherein the ratchet arrangement is located in the radial direction of the support coil within or around a pivot point about which the extruded profile body rotates on separation of the end faces of the adjacent windings.

5. The support coil of claim 1, wherein the ratchet arrangement further includes a ratchet mount connectable with the ratchet element, the ratchet mount having a deflection region in the form of an opening which is not filled by the ratchet element during connection.

6. The support coil of claim 1, wherein the extruded profile body has at least one cavity formed therein.

7. The support coil of claim 1, wherein the end faces extends substantially parallel to each other.

8. The support coil of claim 1, wherein the ratchet arrangement includes the ratchet element and a ratchet mount and at least one securing element secures the ratchet element in the ratchet mount.

9. The support coil of claim 1, wherein the tongue and groove arrangement is substantially rectangular in cross-section of the extruded profile body.

10. The support coil of claim 1, wherein the extruded profile body is formed from a flexible plastic material.

11. The support coil of claim 1, wherein the extruded profile body has at least one slot that opens radially outwardly.

12. The support coil of claim 1, wherein the support coil is tubular.

13. The support coil of claim 1, wherein the tongue and groove arrangement is formed substantially in the shape of an arc in cross-section of the extruded profile body.

14. The support coil of claim 13, wherein the arc is formed about a pivot point about which the extruded profile body rotates on separation of the end faces of the adjacent windings.

15. The support coil of claim 1, wherein the extruded profile body is elastically deformable in a weakened region between the tongue and groove arrangement and the ratchet arrangement.

16. The support coil of claim 15, wherein the weakened region is formed between a tongue of the tongue and groove arrangement and the ratchet element of the ratchet arrangement.

17. The support coil of claim 15, wherein the weakened region has a radial thickness smaller than the remainder of the extruded profile body.

18. The support coil of claim 1, further comprising
a projection protruding in the longitudinal axis from the extruded profile body and connecting to a ratchet element of the ratchet arrangement, the projection forming an inner counter-holding face of the groove and a weakened region.

* * * * *